US 11,758,847 B2

(12) United States Patent
Vandike et al.

(10) Patent No.: US 11,758,847 B2
(45) Date of Patent: Sep. 19, 2023

(54) RESIDUE QUALITY ASSESSMENT AND PERFORMANCE SYSTEM FOR A HARVESTER

(71) Applicant: Deere & Company, Moline, IL (US)

(72) Inventors: Nathan R. Vandike, Geneseo, IL (US); Andrea M. Agarwal, Ankeny, IA (US)

(73) Assignee: Deere & Company, Moline, IL (US)

( * ) Notice: Subject to any disclaimer, the term of this patent is extended or adjusted under 35 U.S.C. 154(b) by 699 days.

(21) Appl. No.: 16/576,053

(22) Filed: Sep. 19, 2019

(65) Prior Publication Data

US 2021/0084820 A1 Mar. 25, 2021

(51) Int. Cl.
| | | |
|---|---|---|
| *A01D 43/08* | (2006.01) | |
| *A01B 79/00* | (2006.01) | |
| *A01D 41/127* | (2006.01) | |
| *A01D 43/073* | (2006.01) | |
| *G05D 1/00* | (2006.01) | |
| *G05D 1/02* | (2020.01) | |

(52) U.S. Cl.
CPC .......... *A01D 43/085* (2013.01); *A01B 79/005* (2013.01); *A01D 41/1278* (2013.01); *A01D 43/073* (2013.01); *G05D 1/0094* (2013.01); *G05D 1/0219* (2013.01)

(58) Field of Classification Search
CPC .............. A01D 43/085; A01D 41/1278; A01D 43/073; A01D 41/127; A01D 41/1243; A01D 43/14; A01B 79/005; G05D 1/0094; G05D 1/0219; G05D 1/0246; G05D 2201/0201
See application file for complete search history.

(56) References Cited

U.S. PATENT DOCUMENTS

| | | | |
|---|---|---|---|
| 6,406,368 B1 | 6/2002 | Cruson et al. | |
| 6,750,898 B1 * | 6/2004 | Ishida ................. | A01C 23/047 |
| | | | 382/110 |
| 6,939,221 B1 | 9/2005 | Redekop et al. | |
| 7,485,035 B1 | 2/2009 | Yde | |
| 9,775,290 B2 | 10/2017 | Schleusner et al. | |
| 9,807,938 B2 | 11/2017 | Wilken et al. | |

(Continued)

FOREIGN PATENT DOCUMENTS

| | | |
|---|---|---|
| BR | 102021011709 A2 | 12/2022 |
| CN | 108093830 A | 6/2018 |

(Continued)

*Primary Examiner* — Frederick M Brushaber
(74) *Attorney, Agent, or Firm* — Michael Best & Friedrich LLP (57) ABSTRACT

A residue vision system includes a harvesting machine configured to traverse a field and harvest an agricultural material, a residue distribution system carried by the harvesting machine and configured to distribute a residue of the agricultural material onto a first harvested area of the field, at least one camera coupled to the harvesting machine and configured to acquire an image of a second harvested area of the field, and an electronic control unit in communication with the at least one camera and the residue distribution system. The electronic control unit is configured to analyze the image acquired by the at least one camera, and in response to the analysis adjust the residue distribution system to adjust distribution of the residue onto the first harvested area of the field.

19 Claims, 4 Drawing Sheets

(56) References Cited

U.S. PATENT DOCUMENTS

| | | | |
|---|---|---|---|
| 10,255,670 B1* | 4/2019 | Wu | H04N 7/183 |
| 10,259,383 B1* | 4/2019 | Campbell | G06K 9/00 |
| 10,952,374 B2* | 3/2021 | Posselius | A01D 41/1243 |
| 11,224,170 B2* | 1/2022 | Dighton | A01D 45/10 |
| 2003/0141965 A1* | 7/2003 | Gunderson | B60Q 9/008 |
| | | | 348/148 |
| 2003/0190939 A1 | 10/2003 | Bueermann | |
| 2005/0059445 A1 | 3/2005 | Niermann et al. | |
| 2005/0194473 A1 | 9/2005 | Pearson et al. | |
| 2006/0183519 A1 | 8/2006 | Benes | |
| 2007/0026912 A1 | 2/2007 | Anderson et al. | |
| 2007/0111766 A1 | 5/2007 | Holmen | |
| 2007/0275775 A1 | 11/2007 | Farley et al. | |
| 2008/0268927 A1 | 10/2008 | Farley et al. | |
| 2009/0005137 A1 | 1/2009 | Isaac et al. | |
| 2009/0111548 A1 | 4/2009 | Landuyt | |
| 2009/0253474 A1 | 10/2009 | Isaac | |
| 2009/0287380 A1 | 11/2009 | Chervenka et al. | |
| 2009/0325659 A1 | 12/2009 | Overschelde et al. | |
| 2011/0045883 A1 | 2/2011 | Weichholdt et al. | |
| 2011/0045884 A1 | 2/2011 | Weichholdt et al. | |
| 2011/0093169 A1 | 4/2011 | Schroeder et al. | |
| 2011/0130181 A1 | 6/2011 | Roberge et al. | |
| 2011/0237316 A1 | 9/2011 | Isaac et al. | |
| 2011/0270495 A1 | 11/2011 | Knapp | |
| 2012/0004815 A1* | 1/2012 | Behnke | A01D 41/1277 |
| | | | 701/50 |
| 2012/0178509 A1 | 7/2012 | Eggenhaus et al. | |
| 2012/0270613 A1 | 10/2012 | Isaac et al. | |
| 2013/0095899 A1* | 4/2013 | Knapp | A01D 41/127 |
| | | | 460/111 |
| 2013/0324199 A1 | 12/2013 | Roberge et al. | |
| 2014/0031096 A1 | 1/2014 | Isaac et al. | |
| 2014/0080555 A1 | 3/2014 | Wagner et al. | |
| 2014/0171160 A1 | 6/2014 | Ricketts et al. | |
| 2014/0302897 A1 | 10/2014 | Isaac et al. | |
| 2015/0264864 A1 | 9/2015 | Branch et al. | |
| 2015/0351321 A1 | 12/2015 | Shane | |
| 2015/0373913 A1 | 12/2015 | Berry et al. | |
| 2016/0069045 A1* | 3/2016 | Wei | E02F 9/2025 |
| | | | 701/50 |
| 2016/0088794 A1 | 3/2016 | Baumgarten et al. | |
| 2016/0134844 A1* | 5/2016 | Casper | H04N 7/181 |
| | | | 348/135 |
| 2016/0374267 A1 | 12/2016 | Reinecke et al. | |
| 2017/0006759 A1* | 1/2017 | Adamchuk | G05D 1/0246 |
| 2017/0034997 A1 | 2/2017 | Mayerle | |
| 2017/0071125 A1 | 3/2017 | Pfeiffer et al. | |
| 2017/0086372 A1 | 3/2017 | Palla et al. | |
| 2017/0086373 A1 | 3/2017 | Mahieu et al. | |
| 2017/0112055 A1* | 4/2017 | Depreitere | A01D 41/127 |
| 2017/0142900 A1 | 5/2017 | Mahieu et al. | |
| 2017/0238463 A1 | 8/2017 | Van De et al. | |
| 2018/0007831 A1 | 1/2018 | Ballegeer et al. | |
| 2018/0084718 A1 | 3/2018 | Baumgarten et al. | |
| 2018/0092301 A1 | 4/2018 | Vandike et al. | |
| 2018/0092302 A1 | 4/2018 | Vandike et al. | |
| 2018/0310474 A1* | 11/2018 | Posselius | A01D 41/1243 |
| 2018/0368318 A1 | 12/2018 | Isaac et al. | |
| 2019/0104681 A1 | 4/2019 | Larson et al. | |
| 2019/0150357 A1* | 5/2019 | Wu | G06T 7/73 |
| 2019/0174674 A1 | 6/2019 | Diessner et al. | |
| 2019/0269071 A1* | 9/2019 | Dilts | A01F 12/40 |
| 2020/0060082 A1 | 2/2020 | Shinners et al. | |
| 2020/0107502 A1 | 4/2020 | Mayerle et al. | |
| 2020/0296896 A1 | 9/2020 | Mayerle | |
| 2020/0323133 A1 | 10/2020 | Anderson et al. | |
| 2020/0396904 A1 | 12/2020 | Faulkner et al. | |
| 2021/0015039 A1 | 1/2021 | Vandike et al. | |
| 2021/0034867 A1 | 2/2021 | Ferrari et al. | |
| 2021/0282329 A1 | 9/2021 | Hall | |
| 2021/0400870 A1 | 12/2021 | Sunil et al. | |
| 2022/0110253 A1 | 4/2022 | Anderson et al. | |
| 2022/0132742 A1 | 5/2022 | Faulkner et al. | |
| 2022/0151139 A1* | 5/2022 | Dugas | A01D 34/006 |
| 2022/0174873 A1 | 6/2022 | Topmöller et al. | |
| 2022/0232768 A1* | 7/2022 | Craig | A01D 41/1217 |
| 2022/0346313 A1 | 11/2022 | Passchyn et al. | |
| 2022/0354054 A1 | 11/2022 | Hermann | |
| 2022/0361411 A1 | 11/2022 | Mayerle et al. | |
| 2022/0361412 A1 | 11/2022 | Duquesne et al. | |
| 2022/0369552 A1 | 11/2022 | Christiansen et al. | |
| 2022/0369553 A1 | 11/2022 | Christiansen et al. | |
| 2022/0369554 A1 | 11/2022 | Christiansen et al. | |
| 2022/0375228 A1* | 11/2022 | Christiansen | G06V 10/44 |
| 2022/0394921 A1 | 12/2022 | Missotten et al. | |
| 2022/0394923 A1 | 12/2022 | Christiansen et al. | |
| 2022/0394924 A1 | 12/2022 | Christiansen et al. | |
| 2022/0394925 A1 | 12/2022 | Missotten et al. | |
| 2022/0397417 A1 | 12/2022 | Christiansen et al. | |
| 2022/0408642 A1 | 12/2022 | Mygind Bojsen | |
| 2023/0026898 A1 | 1/2023 | Baes et al. | |
| 2023/0028281 A1 | 1/2023 | Lorriette | |
| 2023/0037095 A1 | 2/2023 | Mayerle | |

FOREIGN PATENT DOCUMENTS

| | | |
|---|---|---|
| DE | 102014005904 A1 | 10/2015 |
| DE | 102014014049 A1 | 3/2016 |
| EP | 0264764 A2 | 4/1988 |
| EP | 0685151 B1 | 4/1999 |
| EP | 1266553 B1 | 6/2006 |
| EP | 1790207 B1 | 11/2009 |
| EP | 1856966 B1 | 11/2009 |
| EP | 1964465 B1 | 4/2013 |
| EP | 2364587 B1 | 12/2013 |
| EP | 2936962 B1 | 8/2017 |
| EP | 2936961 B1 | 8/2018 |
| EP | 3172959 B1 | 9/2018 |
| EP | 3228174 B1 | 3/2019 |
| EP | 3000302 B1 | 8/2019 |
| EP | 3613272 A1 | 2/2020 |
| EP | 4000373 A1 | 5/2022 |
| EP | 4115723 A1 | 1/2023 |
| EP | 4129044 A1 | 2/2023 |
| GB | 2606740 A | 11/2022 |
| GB | 2606741 A1 | 11/2022 |
| IN | 202011006479 A | 8/2021 |
| NO | 2017075002 A1 | 5/2017 |
| WO | 2003005803 A1 | 1/2003 |
| WO | 2003039238 A1 | 5/2003 |
| WO | 2018076428 A1 | 5/2018 |
| WO | 2018162699 A1 | 9/2018 |
| WO | 2022043785 A1 | 3/2022 |
| WO | 2022043786 A1 | 3/2022 |

* cited by examiner

RESIDUE QUALITY ASSESSMENT AND PERFORMANCE SYSTEM FOR A HARVESTER

BACKGROUND

The present disclosure relates to systems and methods for distributing residue of harvested agricultural products. More specifically, the present disclosure relates to a system that evaluates harvested agricultural product residue distribution during the harvesting process, and in response is configured to modify an aspect of a residue system to improve residue distribution.

SUMMARY

In one aspect, the disclosure provides a residue vision system that includes a harvesting machine configured to traverse a field and harvest an agricultural material, a residue distribution system carried by the harvesting machine and configured to distribute a residue of the agricultural material onto a first harvested area of the field, at least one camera coupled to the harvesting machine and configured to acquire an image of a second harvested area of the field, and an electronic control unit in communication with the at least one camera and the residue distribution system. The electronic control unit is configured to analyze the image acquired by the at least one camera, and in response to the analysis adjust the residue distribution system to adjust distribution of the residue onto the first harvested area of the field.

Other aspects of the disclosure will become apparent by consideration of the detailed description and accompanying drawings.

DETAILED DESCRIPTION

Before embodiments of the disclosure are explained in detail, it is to be understood that the disclosure is not limited in its application to the details of construction and the arrangement of components set forth in the following description or illustrated in the accompanying drawings. The disclosure is capable of supporting other embodiments and of being practiced or of being carried out in various ways.

In addition, various embodiments of the systems and methods herein are disclosed as being applied on or used in conjunction with agricultural material that is processed by a harvester. Agricultural material can include, but is not limited to, hay, straw, silage, cotton, or any other suitable material, product, or crop that can be harvested, separated (or threshed), transported, and/or stored.

Figure 1:
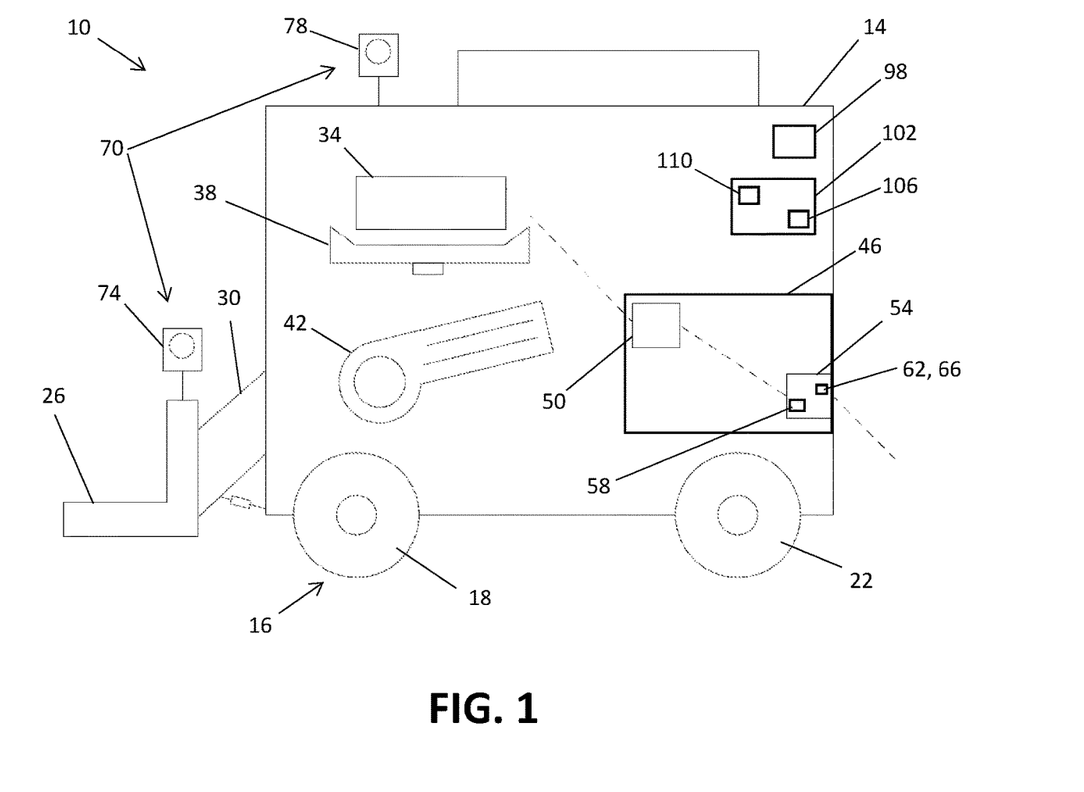
FIG. 1 is a schematic perspective view of an embodiment of a self-propelled agricultural harvesting machine.

FIG. 1 illustrates an embodiment of a self-propelled agricultural harvesting machine 10, and more specifically a combine harvester 10. The harvester 10 includes a frame 14 (or body 14) that is supported by a ground engaging system 16. In the illustrated embodiment, the ground engaging system 16 includes a front wheel assembly 18 and a rear wheel assembly 22. Each wheel assembly 18, 22 includes at least a pair of wheels mounted to an axle (not shown). In other embodiments, the ground engaging system 16 can include a plurality of tracks.

While the illustrated harvesting machine 10 is shown as a combine harvester 10. However, in other embodiments, the harvesting machine 10 can be any suitable machine or device that harvests agricultural material (e.g., corn, grain, soybeans, etc.), separates stalks, straw, and/or chaff from the grain/kernels/beans, collects the stalks, straw, and/or chaff as residue, then processes and/or distributes the residue onto a field.

A harvesting platform 26 (or harvesting head 26) is mounted to a feederhouse 30. The harvesting platform 26 harvests the agricultural product from a field (or other planted land), directing it to the feederhouse 30. The agricultural product is directed by the feederhouse 30 to a processing unit 34. The processing unit 34 threshes and separates the harvested agricultural product material. The processing unit 34 can be a rotary threshing and separating unit. However, in other embodiments, the processing unit 34 can be any apparatus suitable for threshing and separating grain (or kernels, beans, etc.) from the remaining agricultural material.

Separated grain (or kernels, beans, etc.) and chaff are discharged from the processing unit 34 and enter a cleaning assembly 38. The cleaning assembly 38 is configured to remove the chaff from the separated grain (or kernels, beans, etc.). The cleaning assembly 38 can remove the chaff by air (winnowing), grates, or any other suitable cleaning apparatus. The cleaning assembly 38 directs the cleaned grain (or kernels, beans, etc.) to a grain tank (not shown). The grain tank can be unloaded into a grain cart, a truck, or other grain storage or transportation vehicle separate from the harvester 10 by an unloading conveyor 42.

Residue, which can include stalks, stubble (or stems), straw, leaves, seed pods, husks, chaff, and other undesired portions of the harvested agricultural product, is discharged from the processing unit 34 and the cleaning assembly 38 to a residue distribution system 46. For example, stalks, stubble (or stems), straw, leaves, seed pods, and/or husks separated from the grain (or kernels, beans, etc.) and chaff by the processing unit 34 is discharged to the residue distribution system 46. In addition, chaff separated from the grain (or kernels, beans, etc.) by the cleaning assembly 38 is discharged to the residue distribution system 46.

The residue distribution system 46 includes a chopping assembly 50 and a spreading assembly 54. The chopping assembly 50 (or chopper) can include a plurality of blades (or a knife bank) (not shown) mounted to a rotor (not shown) that is positioned in a housing (not shown). The rotor can be driven by a motor (not shown). The blades are configured to rotate with the rotor to chop (or cut) the residue into smaller pieces. The motor can be a multi-speed motor to provide different rotational speeds of the rotor. Stated another way, the speed of the motor can be adjusted to responsively adjust rotor speed to change a chop quality (e.g., an increase in motor speed can increase a rotor speed to produce a fine chop, a decrease in motor speed can decrease a rotor speed to produce a coarse chop, etc.). An example of the chopping assembly 50 and associated operation is described as the residue chopping and distribution arrangement disclosed in U.S. Pat. No. 9,345,198, the contents of which is incorporated by reference in its entirety. In other embodiments, the chopping assembly 50 can include any suitable or desired cutting components to facilitate the cutting or chopping of residue into smaller pieces.

Downstream of the chopping assembly 50 is the spreading assembly 54. The spreading assembly 54 is configured to distribute the chopped (or cut) residue out of the spreading assembly 54, and the harvester 10, and onto a harvested field. The spreader assembly 54 can include a rotary or broadcast spreader 58 that can be driven by a motor (not shown). The motor can have multiple speeds in order to adjust the rotational speed of the spreader 58. The rotational speed of the spreader 58 can be adjusted to change the spread distance of the residue (e.g., increase speed to increase the spread distance, decrease speed to decrease the spread distance, etc.). An example of the spreader 58 and associated operation is described as the chaff spreader disclosed in U.S. Pat. No. 9,345,198, referenced above. In that embodiment, the spreader 58 can include a plurality of paddles that extend radially from a hub that is configured to engage a drive shaft. Rotation of the drive shaft in turn rotates the hub and associated paddles, facilitating spreading of the residue.

The spreader assembly 54 can additionally (or alternatively) include one or more guide vanes 62. The guide vanes 62 can be disposed relative to an outlet of the residue distribution system 46 and configured to direct a flow of the residue out of the spreading assembly 54 (and the harvester 10) and onto the harvested field. The guide vanes 62 can include a deflector, a vane, a fin, or any other suitable device for directing the flow of residue. The guide vanes 62 can also include one or more actuators 66 that are configured to respectively adjust an associated guide vane 62. The actuators 66 can be electronic, hydraulic, or any other suitable device for moving the guide vanes 62. The actuators 66 can be configured to adjust the guide vanes 62 to change an amount of residue being discharged onto a harvested field (e.g., increase flow volume, decrease flow volume, etc.), and/or to adjust a direction of guide vanes 62 to control (or alter) the direction of the flow of the residue being discharged onto a harvested field. In other embodiments, the spreader assembly 54 can include any suitable or desired components to facilitate the spreading and controlled distribution of residue onto a harvested field.

A residue vision system 70 is mounted to the harvester 10. The residue vision system 70 is configured to optically capture images of a portion of a harvested field. The images can then be analyzed to ascertain the quality of residue on the harvested field (e.g., residue coverage, residue size, etc.), and in response adjust the residue distribution system 46 to improve residue quality on the harvested field (e.g., adjust residue chop quality to produce a finer or coarser residue, adjust a residue distribution to increase or decrease spread distance, adjust a residue distribution to adjust a residue distribution direction, adjust a residue distribution to increase or decrease an amount of discharged residue, etc.).

Figure 2:
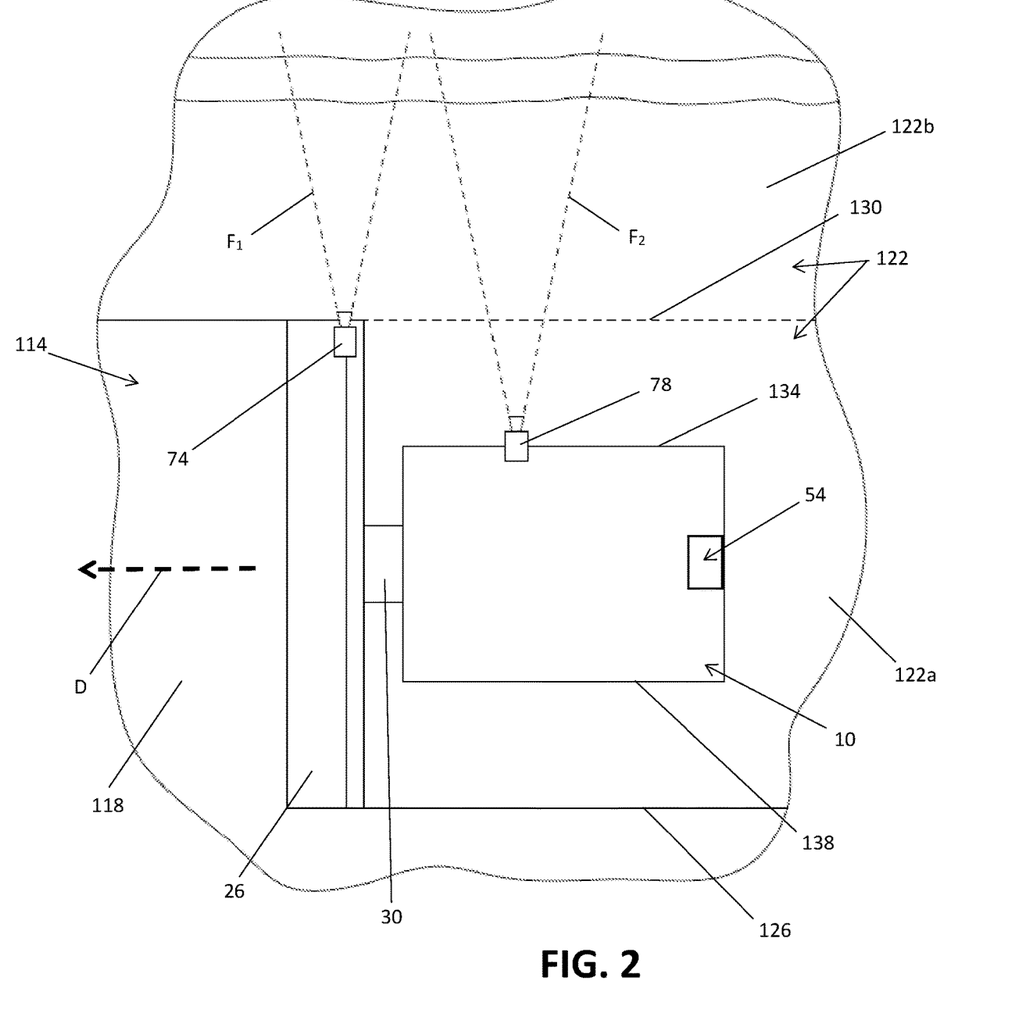
FIG. 2 is a schematic plan view of the harvesting machine of FIG. 1 illustrating the harvesting operation and aspects of a residue vision system.

The residue vision system 70 includes at least one camera 74, 78. In the illustrated embodiment, the residue vision system 70 includes a first camera 74 and a second camera 78. The first camera 74 is positioned on the harvesting platform 26, while the second camera 78 is positioned on the frame 14. As illustrated in FIG. 2, the first camera 74 is positioned toward an end of the harvesting platform 26, such that the first camera 74 is horizontally offset from the second camera 78. Referring back to FIG. 1, the second camera 78 is positioned at a different height (or vertically offset) relative to the first camera 74. More specifically, the second camera 78 is positioned above the first camera 74. This allows each camera 74, 78 to capture different views and associated images. While the illustrated embodiment discloses the residue vision system 70 as having a plurality of cameras 74, 78, and more specifically two cameras 74, 78, in other embodiments only a single camera is utilized. For example, one of the first camera 74 or the second camera 78 can be used in association with the residue vision system 70. In other embodiments, a plurality of cameras 74, 78 (or two or more cameras 74, 78) can be used in association with the residue vision system 70.

With reference to FIG. 2, the first camera 74 has a first field of view $F_1$. The second camera 78 has a second field of view $F_2$. The first camera 74 and the second camera 78 are oriented such that the respective fields of view $F_1$, $F_2$ are positioned at an angle to a direction of travel D of the harvester 10. In the illustrated embodiment, the respective fields of view $F_1$, $F_2$ are positioned orthogonal (or perpendicular) to the direction of travel D. In other embodiments, the respective fields of view $F_1$, $F_2$ are positioned oblique to the direction of travel D. Generally, the fields of view $F_1$, $F_2$ are not positioned parallel to the direction of travel D (either facing directly forward or directly rearward). Directly forward facing cameras struggle to capture enough of the residue on the harvested field in an image, while directly rearward facing cameras can have poor image quality due to dust, debris, and other airborne material that is generated by the harvester 10 during the harvesting process.

Figure 3:
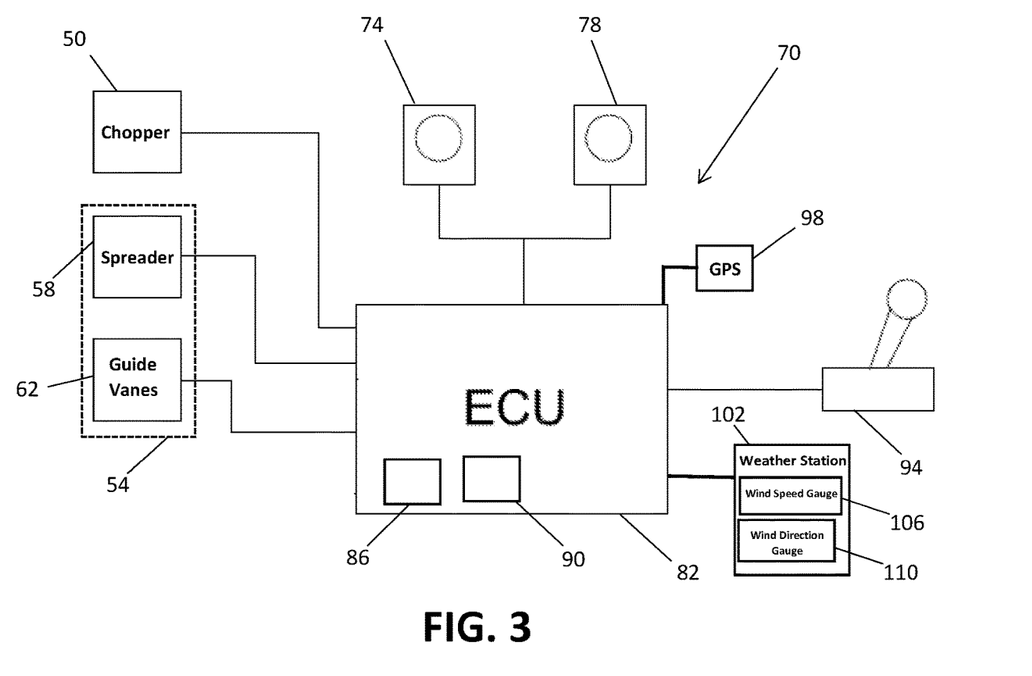
FIG. 3 is a schematic view of the residue vision system of the harvesting machine of FIG. 1.

With reference to FIG. 3, the residue vision system 70 also includes an electronic control unit 82 (or ECU 82). The electronic control unit 82 can be a computer processing system (or a controller). The electronic control unit 82 can include a processor 86 and a computer readable storage medium 90. The electronic control unit 82 is in communication with the at least one camera, and more specifically with the first camera 74 and the second camera 78. The electronic control unit 82 is also in communication with the chopping assembly 50 and/or the spreading assembly 54. More specifically, the electronic control unit 82 can be in communication with the chopping assembly 50, the spreader 58, and the guide vanes 62. The electronic control unit 82 can be configured to provide operational commands to the chopping assembly 50, the spreader 58, and/or the guide vanes 62. A switch 94 (or button 94) can be in communication with the electronic control unit 82. The switch 94 is operable by a user to initiate operation of the residue vision system 70, and associated aspects of a residue control system 200, which is discussed in additional detail below. As such, the residue vision system 70 and associated application 200 can be enabled and/or disabled by a user (or operator) during operation of the harvester 10. The communication can be wired, wireless, or any suitable system for communication (e.g., radio, cellular, BLUETOOTH, etc.). In the illustrated embodiment, the electronic control unit 82 is a dedicated system positioned on the harvester 10. In other embodiments, the electronic control unit 82 can be a handheld or wireless device, such as a smart phone, tablet computer, laptop computer, or any other suitable computing or processing device.

With reference back to FIG. 1, the harvester 10 can include a Global Positioning System (GPS) receiver 98. The harvester GPS receiver 98 can monitor the global location of the harvester 10. The harvester GPS receiver 98 is in communication with the electronic control unit 82 of the residue vision system 70, as illustrated in FIG. 3. The communication can be wired, wireless, or any suitable system for communication (e.g., radio, cellular, BLUETOOTH, etc.).

The harvester 10 can also include a weather station 102 that is configured to detect one or more ambient weather conditions. As illustrated in FIG. 1, the weather station 102 can include a wind speed gauge 106. The wind speed gauge 106 can be an anemometer or any other suitable instrument configured to detect wind speed. In addition, the weather station 102 can include a wind direction gauge 110. The wind direction gauge 110 can be a wind vane (or weather vane) or any other suitable instrument configured to detect wind direction. The weather station 102 and the associated components can be analog or digital. The weather station 102 is in communication with the electronic control unit 82 of the residue vision system 70, as illustrated in FIG. 3. The communication can be wired, wireless, or any suitable system for communication (e.g., radio, cellular, BLUETOOTH, etc.).

With reference back to FIG. 2, the harvester 10 is illustrated traversing a field 114 in the direction of travel D. The field 114 includes an uncut crop area 118 (or unharvested crop area 118) and a harvested area 122. The uncut crop area 118 has not yet been encountered by the harvesting platform 26 of the harvester 10. The harvested area 122 includes a first harvested area 122a and a second harvested area 122b. The first harvested area 122a is a portion of the harvested area 122 that is positioned in the current pass of the harvester 10 in the field 114. The second harvested area 122b is a portion of the harvested area 122 that includes a previous pass (or an immediately previous pass) of the harvester 10. As such, the first harvested area 122a is illustrated as offset (or an offset row) from the second harvested area 122b. In addition, the first harvested area 122a is defined on one side by an uncut edge 126 and on a second, opposite side by a cut edge 114. The uncut edge 126 defines a first border between the first harvested area 122a and the uncut crop area 118, while the cut edge 130 defines a second border between the first harvested area 122a and the second harvested area 122b (or the previous pass of the harvester 10). The edges 126, 130 correspond to opposing ends of the harvesting platform 26. As such, a width of the harvested area 122a, 122b is defined by the width of the harvesting platform 26.

It should be appreciated that the cameras 74, 78 and associated views $F_1$, $F_2$ illustrated in FIGS. 1-2 are shown on one side of the harvester 10. However, this orientation is shown for purposes of illustration. In many embodiments, the residue vision system 70 includes at least one camera (or a plurality of cameras) oriented to view outward from a first side 134 (as shown in FIG. 2) of the harvester 10, and at least one camera (or a plurality of cameras) oriented to view outward from a second side 138 (see FIG. 2), opposite the first side 134 of the harvester 10. Having cameras oriented to view outward from each side 134, 138 of the harvester 10 can facilitate operation of the residue vision system 70 during operation of the harvester 10 independent of the direction of travel D. For example, the harvester 10 often traverses the field 114 in a back and forth (or alternating or serpentine) pattern. This allows the residue vision system 70 to observe the second harvested area 122b (or previous pass) independent of the orientation of the harvester 10 and/or the direction of travel D in the current pass.

Figure 4:
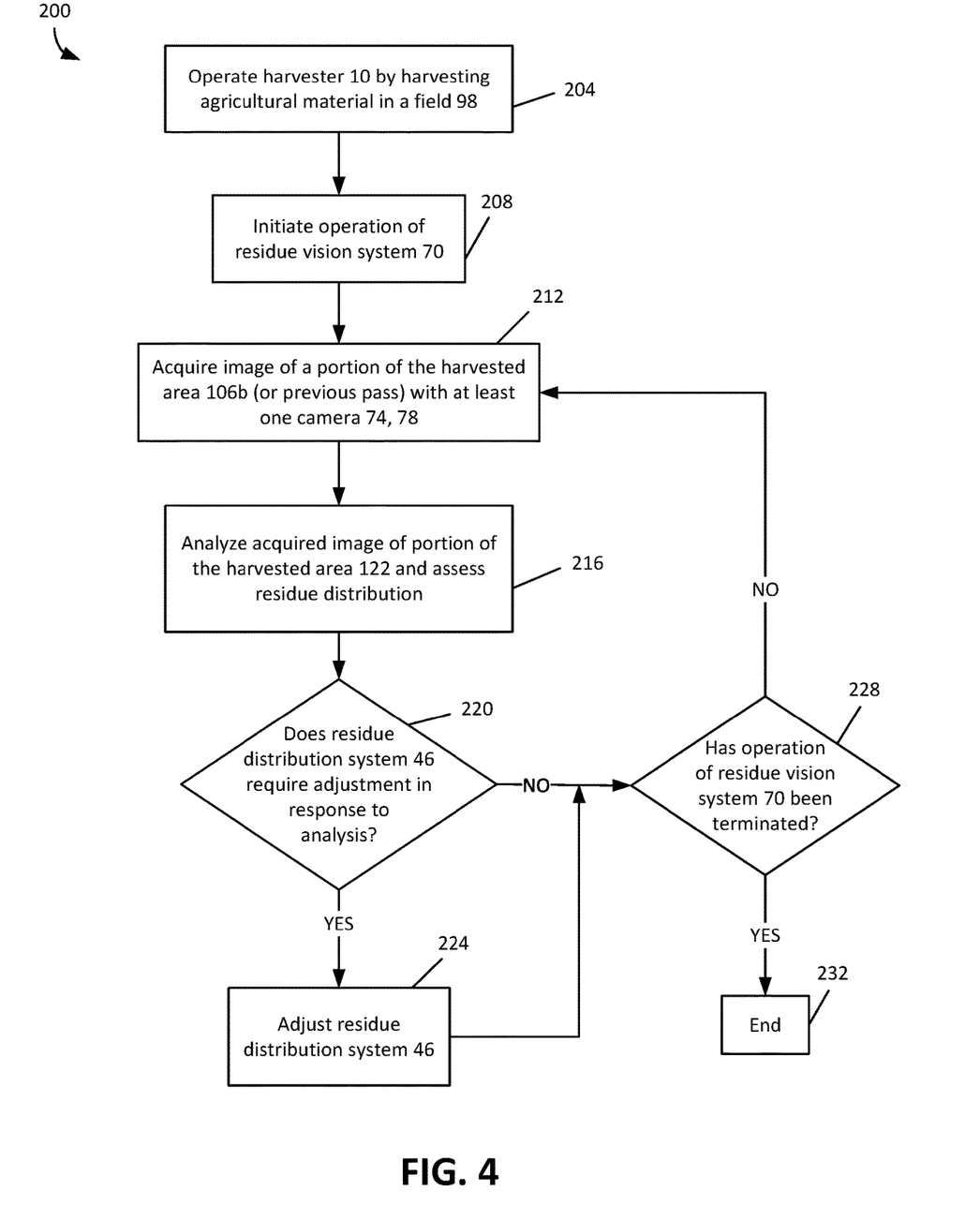
FIG. 4 is a flow diagram of an embodiment of a residue control system of the harvesting machine of FIG. 1.

FIG. 4 illustrates an example of the residue control system 200 (or residue control application 200) that uses information acquired from the residue vision system 70 to determine performance of the residue distribution system 46. More specifically, the system 200 captures and analyzes images of a portion of the harvested area 122b to ascertain residue distribution, and in response to the analysis can adjust one or more aspects of the residue distribution system 46.

The residue control system 200 can be an application or module that operates in a local environment. For example, the system 200 can be a module that is stored locally on the electronic control unit 82 (e.g., on the computer readable storage medium 90, etc.) associated with the harvester 10. In other embodiments, the system 200 can be a module that is stored on any other device or equipment in the vicinity of and in communication with the harvester 10 (e.g., a laptop computer, smartphone, etc.). In other embodiments, the residue control system 200 can be distributed (i.e. operates on a remote server or from a remote location) and is in communication with the electronic control unit 82. The communication can be through any suitable wireless connection, a web portal, a web site, a local area network, generally over the Internet, etc. The residue control system 200 includes a series of processing instructions or steps that are depicted in flow diagram form.

Referring to FIG. 4, the residue control system 200 begins with operation of the harvester 10. As shown in FIG. 2, at step 204 the harvester 10 is operating within the field 114 harvesting agricultural material. As the harvester 10 traverses the field in the direction of travel D, the harvesting platform 26 harvests standing crop (or agricultural product). The crop enters the harvesting platform 26, travels through the feederhouse 30, and into the processing unit 34 (see FIG. 1). The processing unit 34 threshes and separates the harvested agricultural product material. Residue from the processing unit 34 and the cleaning assembly 38 (see FIG. 1) is transferred to the residue distribution system 46 (shown by broken line in FIG. 1). In the residue distribution system 46 the residue is chopped by the chopping assembly 50 (see FIG. 1), transferred to the spreading assembly 54 (shown by broken line in FIG. 1), and then distributed onto the first harvested area 122a of the field 114 by the spreading assembly 54 (shown by broken line in FIG. 1).

Next at step 208, operation of the residue vision system 70 is initiated. For example, an operator (or user) of the harvester 10 actuates the switch 94 (see FIG. 3). The operator may wait to actuate the switch 94 until harvesting at least one pass of the field 114. This will allow for creation of a previous pass (or formation of the second harvested area 122b). In response to actuation of the switch 94, the residue vision system 70 begins operation.

At step 212, the residue vision system 70 acquires an image of a portion of the second harvested area 122b (or the previous pass of the harvester 10 through the field 114). At least one camera 74, 78 is configured to capture the image of the second harvested area 122b. As shown in FIG. 2, the first camera 74 can capture a first image of the second harvested area 122b from the first field of view $F_1$. The second camera 78 can capture a second image of the second harvested area 122b from the second field of view $F_2$. The first and second images can be taken of the same portion of the second harvested area 122b or different portions of the second harvested area 122b. For example, the first image can be a close up image of a portion of the second harvested area 122b, while the second image can be a wider view (or panoramic) image of the portion of the second harvested area 122b. The image differences can be based on the horizontally offset configuration of the cameras 74, 78, as the second camera 78 is positioned a distance further away from the second harvested area 122b than the first camera 74. In other embodiments, the cameras 74, 78 can be focused or tuned to capture any needed view, similar view, or different views of the second harvested area 122b (e.g., panoramic, close-up, etc.). In addition, the cameras 74, 78 can be sequenced to capture an image of the same portion of the second harvested area 122b as the harvester 10 traverses the field 114. For example, the first camera 74 can capture the first image of a portion of the second harvested area 122b, while the second camera 78 captures the second image of the same portion of the second harvested area 122b at a time later than the first camera 74. The later time (or time delay) can be based on the speed of the harvester 10 and/or the horizontal offset (or distance) between the cameras 74, 78 along the direction of travel D.

Next at step 216, the acquired image (or images) captured by the at least one camera 74, 78 (or cameras 74, 78) is analyzed to assess the distribution of residue in the second harvested area 122b. The image(s) of the second harvested area 122b are digital images that are communicated to the electronic control unit 82. The electronic control unit 82 can then analyze the image(s). In other embodiments, a computer system (or processing system) remote to the electronic control unit 82 but in communication with the electronic control unit 82 can perform the analysis of the image(s).

The analysis of the image(s) can include evaluating the image to distinguish between standing crop (if present), stubble, residue, and open areas (or uncovered ground) of the harvested area 122b of the field 114. For example, the system can detect if any standing crop is present in the image, and quantify an amount of standing crop (as standing crop is taller than the other material). The system can also detect any stubble, which is the stalk and/or stem material that remains in the harvested area 122 (e.g., in the ground, etc.) after the agricultural material is harvested. The stubble generally sticks up (or protrudes) from the harvested area 122, but is substantially shorter than standing crop. The system can also detect residue that has been distributed by the harvester 10 out of the spreading assembly 54. The residue is detected in relation to the stubble and any open areas (or areas that do not include stubble or residue). To detect standing crop, stubble, residue, and open areas, the system can look at an orientation of material in the image(s) (e.g., standing or sticking out of ground versus laying on the ground, etc.), color of the material in the image(s) (e.g., stubble and residue can have a different color than open areas/uncovered ground, etc.), shape of the material in the image(s) (e.g., stubble protrudes out of the ground, residue is cut up and randomly distributed over the ground, open areas do not include any shaped material, etc.), a height of the stubble (e.g., determine an estimated height of the stubble based on an image comparison between the captured image of stubble and a database of images of known stubble heights at different distances from the at least one camera 74, 78 detecting the image, etc.), and/or a texture of the material in the image(s) (e.g., residue has a texture that is different than open areas, etc.).

Once the material is detected in the image(s), the system analyzes the image(s) for a quality of residue distribution. For example, the image is analyzed to determine if residue is distributed such that it extends across a width of the second harvested area 122b. The width of the second harvested area 122b is defined as the distance between the edges 126, 130 of the prior pass of the harvester 10. If the residue does not extend entirely across the width of the second harvested area 122b, or is an incomplete spread, the system determines where the residue is not present (e.g., where an open area is detected). For example, the residue may be distributed over an incomplete distance between one (or both) of the edges 126, 130 of the second harvested area 122b, with a band (or bands) of open area positioned between the residue and one (or both) of the edges 126, 130. In another example, residue may be incompletely chopped (or clumping) in areas of the second harvested area 122b. This is detected by areas of residue and areas of open area in the second harvested area 122b. In these situations, where the residue is not evenly distributed across the second harvested area 122b, the residue distribution system 46 requires adjustment at step 220. In other situations, were the analysis determines the residue is distributed across the second harvested area 122b in an acceptable manner (or is a full spread), the residue distribution system 46 does not require an adjustment at step 220.

In response to the analysis of the image(s), the system determines whether to adjust an aspect of the residue distribution system 46 at step 220. If yes, the system determines that based on the analysis of the image(s) the residue distribution system 46 should be adjusted, the system proceeds to step 224 to adjust the residue distribution system 46. If no, the system determines that based on the analysis of the image(s) the residue distribution system 46 should not be adjusted, the process proceeds to step 228. The harvester 10 continues to operate and distribute residue in the first harvested area 122a.

At step 224 the residue distribution system 46 is adjusted. The adjustment can be associated with one or more components of the residue distribution system 46, including, but not limited to, the chopping assembly 50, the spreader 58, and/or the guide vanes 62. In addition, the adjustment can be responsive to address detected issues in chop quality of the residue, or to address detected issues in residue spread distribution and/or residue spread width that were detected during the image analysis and residue distribution assessment at step 216.

As a non-limiting example, if the system 200 determines a detected issue with chop quality of the residue, such as the residue is being incompletely chopped (or alternatively the residue is being overly chopped) at steps 216-220, the system 200 can responsively implement changes to adjust the residue chop quality at step 224. More specifically, the system 200 can implement an adjustment to the chopping assembly 50 at step 224. In situations where the residue is being incompletely chopped, the system can instruct the electronic control unit 82 to command the chopping assembly 50 to increase a motor speed to increase a speed of the plurality of blades (or knife bank) and/or adjust a depth of the plurality of blades (or the knife bank) within the chopping assembly 50 (e.g., increase the depth of the blades or knife bank within the chopping assembly 50) to adjust the chop quality (e.g., implement a finer chop, etc.). In situations where the residue is being overly chopped, the system 200 can instruct the electronic control unit 82 to command the chopping assembly 50 to decrease a motor speed to decrease the speed of the plurality of blades (or knife bank) and/or adjust a depth of the plurality of blades (or the knife bank) within the chopping assembly 50 (e.g., decrease the depth of the blades or knife bank within the chopping assembly 50) to adjust the chop quality (e.g., implement a coarser chop, etc.).

It should be appreciated that in addition to the image analysis and assessment at step 216, the system 200 can consider additional information when addressing detected issues in chop quality of the residue. For example, the system 200 can consider a global position of the harvester 10 (or position of the harvester 10 in the field 114) detected by the GPS receiver 98, a feed rate of agricultural product entering the harvesting head 26, a feed rate of residue entering the residue distribution system 46, a moisture level of material other than grain (or "MOG"), a speed of the chopping assembly 50, and/or a position of a knife bank within (or relative to) the chopping assembly 50. With regard to the moisture level of MOG, a moisture sensor (not illustrated) can be positioned at a sample location along a flow direction of the residue from the processing unit 34, to the cleaning assembly 38, to the residue distribution system 46. The moisture sensor can be inline and configured to detect a water level (or moisture level) of the MOG. With regard to the speed of the chopping assembly 50, any suitable speed sensor (not illustrated) can be used to measure a rotational speed of the rotor and/or knife bank of the chopping assembly 50. For example, a tachometer can be used to measure the rotational speed of the rotor or the knife bank. With regard to the position of the knife bank within (or relative to) the chopping assembly 50, any suitable position sensor (not illustrated) can be used to measure a position of the plurality of knives (or knife bank) relative to the chopping assembly 50 (or the housing of the chopping assembly 50). For example, one or more of a potentiometer, a position sensor associated with a hydraulic cylinder for inserting/withdrawing the knives and/or knife bank relative to the chopping assembly 50, and/or a proximity switch can be used to measure the position (or depth) of the knives and/or knife bank relative to the chopping assembly 50 (or housing of the chopping assembly 50).

As another non-limiting example, if the system 200 determines a detected issue with residue spread distribution, such as the residue is not being distributed in one (or more areas) of the second harvested area 122b at steps 216-220, the system 200 can responsively implement changes to the spreader assembly 54 to adjust a trajectory, a direction, and/or a spread distance of the residue discharge out of the harvester 10 at step 224 to improve the distribution of residue spread. More specifically, the system 200 can instruct the electronic control unit 82 to command the spreader assembly 54 to implement an adjustment to the guide vanes 62 to adjust the trajectory or the direction of residue discharge out of the harvester 10. In addition, or alternatively, the system 200 can implement an adjustment to the spreader 58. For example, the system 200 can instruct the electronic control unit 82 to command the spreader assembly 54 to implement an adjustment to a speed of the motor driving the spreader 58 to increase a spread distance (e.g., increase a rotational speed of the spreader by increasing the motor speed, etc.) or decrease a spread distance (e.g., decrease a rotational speed of the spreader by decreasing the motor speed, etc.). This in turn directs the residue to responsively address (or correct) the distribution of residue discharge out of the harvester 10 in the first harvested area 122a.

As another non-limiting example, if the system 200 determines a detected issue with residue spread width across the second harvested area 122b at steps 216-220, the system 200 can responsively implement changes to adjust the spreading assembly 54 at step 224 to adjust the spread of residue. More specifically, in situations where the residue is not being completely spread (or is an incomplete spread) across the second harvested area 122b, the system 200 can instruct the electronic control unit 82 to command the spreader 58 to increase the spread distance (e.g., increase a rotational speed of the spreader, etc.) of the residue and/or to adjust the guide vanes 62 to responsively change a direction of the spread residue to increase the spread distance to increase spread width and fill in any area that is not receiving residue. In situations where the residue is being spread too far, or is overthrowing residue (or over spreading residue), such that the residue extends beyond the edges 126, 130 of the second harvested area 122b, the system 200 can instruct the electronic control unit 82 to command the spreader 58 to decrease the spread distance (e.g., decrease a rotational speed of the spreader, etc.) of the residue and/or to adjust the guide vanes 62 to responsively change a direction of the spread residue to decrease the spread distance to decrease spread width. In addition, in some situations where it is detected that residue has not been completely spread in the second harvested area 122b, the system can instruct the electronic control unit 82 to command the spreader 58 to overthrow residue while in the first harvested area 122a in order to apply residue to the uncovered area. For example, if it is detected that residue has not been applied to an area from the cut edge 130 into the second harvested area 122b (or previous pass of the harvester 10), the system 200 can instruct the electronic control unit 82 to command the spreader 58 to increase the spread distance (e.g., increase a rotational speed of the spreader, etc.) of the residue and/or to adjust the guide vanes 62 to responsively overthrow residue while in the first harvested area 122a (or the current pass of the harvester 10) to fill in the area of the second harvested area 122b that is not covered by residue. Independent of the residue distribution system 46 adjustment being implemented, the system detects residue distribution performance in the second harvested area 106b and when necessary, attempts to resolve any detected residue distribution performance deficiency in the first harvested area 106a.

It should be appreciated that in addition to the image analysis and assessment at step 216, the system 200 can consider additional information when addressing detected issues in residue spread distribution and/or residue spread width. For example, the system 200 can consider a global position of the harvester 10 (or position of the harvester 10 in the field 114) detected by the GPS receiver 98, a feed rate of agricultural product entering the harvesting head 26, a feed rate of residue entering the residue distribution system 46, the moisture level of MOG, a wind speed, a wind direction, a rotational speed of the spreader 58, a position of the guide vanes 62, a slope of the harvester 10, and/or a speed of the harvester 10 as it travels through the field 114. With regard to the wind speed, the wind speed gauge 106 of the weather station 102 can be used to measure (or detect) the wind speed of the ambient weather surrounding the harvester 10. With regard to the wind direction, the wind direction gauge 110 of the weather station 102 can be used to measure (or detect) the wind direction of the ambient weather surrounding the harvester 10. The system 200 can responsively adjust residue spread distance and/or residue spread direction as discussed above based on the ambient wind speed and ambient wind direction to improve residue coverage in the harvested areas 122a, b. With regard to the rotational speed of the spreader 58, any suitable speed sensor (not illustrated) can be used to measure a rotational speed of the spreader 58. For example, a tachometer can be used to measure the rotational speed of the rotary spreader. With regard to the position of the guide vanes 62, any suitable position sensor (not illustrated) can be used to measure a position of the guide vane 62 relative to the spreading assembly 54 (or the housing of the spreading assembly 54). For example, one or more of a potentiometer, a position sensor associated with a hydraulic cylinder for moving each guide vane 62 relative to the spreading assembly 54 and/or a proximity switch can be used to measure the position of each guide vane 62. With regard to a slope of the harvester 10, any suitable sensor that is configured to detect an orientation of the harvester 10 based on the terrain of the field 114 can be used. For example, an inertial measurement unit can be positioned on the harvester 10 and can be configured to detect a change in (or measure a position and/or orientation of) the harvester 10 along three axes: an X-axis or roll, a Y-axis or yaw, and a Z-axis or pitch. With regard to the speed of the harvester 10, a speedometer or other suitable sensor configured to detect a speed (or velocity) of harvester 10 can be used to detect the speed of the harvester 10 as it travels through the field 114.

As another non-limiting example, if the system 200 determines a detected issue with stubble height, such as the stubble being taller than a target stubble height (or the stubble being shorter than a target stubble height) at steps 216-220, the system 200 can responsively adjust a position of the harvesting platform 26 (or harvesting head 26) at step 224 to modify the stubble height to be closer to the target stubble height. With some crops (e.g., corn, etc.) an aspect of residue is a target stubble height (or stalk stubble height). An operator of the harvesting machine 10 can set a target stubble height $T_{SH}$ during harvesting. The harvesting platform 26 will then responsively adjust its position relative to the harvesting machine 10 to pursue the target stubble height $T_{SH}$ during harvesting. If the system 200 determines at steps 216-220 that the detected actual stubble height $A_{SH}$ is greater than the target stubble height $T_{SH}$ ($A_{SH}>T_{SH}$), the system 200 can adjust the harvesting platform 26 to reduce the actual stubble height $A_{SH}$ at step 224. For example, the system 200 can lower the harvesting platform 26 relative to the harvesting machine 10, or the system 200 can lower the harvesting platform 26 to be closer to the ground. If the system 200 determines at steps 216-220 that the detected actual stubble height $A_{SH}$ is less than the target stubble height $T_{SH}$ ($A_{SH}<T_{SH}$), the system 200 can adjust the harvesting platform 26 to increase the actual stubble height $A_{SH}$ at step 224. For example, the system 200 can raise the harvesting platform 26 relative to the harvesting machine 10, or the system 200 can raise the harvesting platform 26 to be further away from the ground.

After completion of step 224, the process then proceeds to step 228. At step 228 the system detects whether operation of the residue vision system 70 has been terminated. Termination can occur by actuation of the switch 94 by the operator, or by powering down the harvester 10. If yes, operation of the residue vision system 70 has been terminated, the system proceeds to step 232, which ends operation of the system. If no, operation of the residue vision system 70 has not been terminated, the system returns to step 212 where the process repeats.

The residue vision system 70 and associated application 200 include certain advantages. The system provides for autonomous adjustment of residue distribution in a first harvested area 122a in response to a detected residue distribution performance in the second harvested area 122b. Stated another way, residue distribution performance detected in a prior harvesting path is evaluated and used to automatically adjust residue distribution in the current harvesting path. The system attempts to spread residue as evenly as possible across the width of the first harvested area 122a (as defined by the width of the harvesting platform 26 or the distance between the edges 126, 130 of the first harvested area 122a). By matching the width of the first harvested area 122a, the residue can improve nutrient content in the harvested area 122 of the field 114, which can improve crop yield the following year. The system limits under spreading of residue, which can negatively impact crop yield the following year due to lower nutrient content in the harvested area 122 of the field 114. The system also limits over spreading (or overthrowing) of residue, which can plug the harvesting platform 26 in the next pass of the harvester 10 through the field 114. These and other features and advantages of the disclosure are set forth herein.

What is claimed is:

1. A residue vision system comprising:
a harvesting machine configured to traverse a field and harvest an agricultural material;
a residue distribution system carried by the harvesting machine and configured to distribute a residue of the agricultural material onto a first harvested area of the field;
at least one camera coupled to the harvesting machine and configured to acquire, during operation of the harvesting machine, an image of a second harvested area of the field, wherein the first harvested area is offset from the second harvested area, wherein the first harvested area is a current pass of the harvesting machine in the field, and wherein the second harvested area is a previous pass of the harvesting machine in the field; and
an electronic control unit in communication with the at least one camera and the residue distribution system, the electronic control unit configured to analyze the image acquired by the at least one camera, and in response to the analysis adjust the residue distribution system to adjust distribution of the residue onto the first harvested area of the field.

2. The residue vision system of claim 1, wherein the at least one camera includes a first camera and a second camera.

3. The residue vision system of claim 2, wherein the first camera is oriented to view laterally outward from a first side of the harvesting machine, and wherein the second camera is oriented to view laterally outward from a second side of the harvesting machine opposite the first side, such that the residue vision system is configured to operate independently of a direction of travel of the current pass.

4. The residue vision system of claim 2, wherein the first camera and the second camera are both configured to capture images of a same portion of the second harvested area.

5. The residue vision system of claim 2, wherein the first camera and the second camera are configured to capture images of different portions of the second harvested area.

6. The residue vision system of claim 2, wherein the first camera is configured to capture a first image of the second harvested area, and wherein the second camera is configured to capture a second image of the second harvested area, the second image a wider image than the first image.

7. The residue vision system of claim 1, wherein the residue distribution system includes a chopping assembly configured to cut the residue, and in response to the analysis the electronic control unit is configured to adjust the chopping assembly to change a chop quality of the residue.

8. The residue vision system of claim 7, wherein to change the chop quality of the residue includes to produce a fine chop residue or a coarse chop residue.

9. The residue vision system of claim 1, wherein the residue distribution system includes a spreader configured to spread the residue, and in response to the analysis the electronic control unit is configured to adjust the spreader to change a spreading distance of the residue.

10. The residue vision system of claim 9, wherein to change the spreading distance of the residue includes increasing a spread distance or decreasing a spread distance.

11. The residue vision system of claim 1, wherein the residue distribution system includes a guide vane configured to direct distribution of the residue, and in response to the analysis the electronic control unit is configured to adjust the guide vane to change the direction of distribution of the residue onto the first harvested area of the field.

12. The residue vision system of claim 1, wherein the electronic control unit is configured to analyze the image acquired by the at least one camera to identify at least the residue and an open area in the image.

13. The residue vision system of claim 12, wherein the electronic control unit is configured to analyze the image acquired by the at least one camera to identify stubble in the image.

14. The residue vision system of claim 1, wherein the harvesting machine is configured to traverse the field in a direction of travel, and the at least one camera includes a field of view oriented oblique to the direction of travel.

15. The residue vision system of claim 1, wherein the harvesting machine is configured to traverse the field in a direction of travel, and the at least one camera includes a field of view oriented perpendicular to the direction of travel.

16. The residue vision system of claim 1, further comprising:
a harvesting platform mounted to the harvesting machine, the harvesting platform defining a width of the first harvested area of the field,
wherein in response to the analysis, the electronic control unit is configured to adjust the residue distribution system to adjust distribution of the residue to maximize coverage across the width of the first harvested area of the field.

17. The residue vision system of claim 1, wherein the previous pass of the harvesting machine in the field is adjacent to the current pass of the harvesting machine in the field.

18. The residue vision system of claim 1, further including a switch configured to initiate operation of the residue vision system after the harvesting machine has completed at least one pass of the field.

19. The residue vision system of claim 1, wherein the residue vision system is configured to detect a harvested stubble height of agricultural material and, based at least in part on the detection, to adjust a harvesting platform to harvest agricultural material at a target stubble height not equal to the harvested stubble height.

* * * * *

UNITED STATES PATENT AND TRADEMARK OFFICE
CERTIFICATE OF CORRECTION

PATENT NO. : 11,758,847 B2
APPLICATION NO. : 16/576053
DATED : September 19, 2023
INVENTOR(S) : Nathan R. Vandike and Andrea M. Agarwal It is certified that error appears in the above-identified patent and that said Letters Patent is hereby corrected as shown below:

In the Specification

At Column 10 Lines 24-26, read:
"Independent of the residue distribution system 46 adjustment being implemented, the system detects residue distribution performance in the second harvested area 106 b and when necessary, attempts to resolve any detected residue distribution performance deficiency in the first harvested area 106 a"

Should read:
"Independent of the residue distribution system 46 adjustment being implemented, the system detects residue distribution performance in the second harvested area 122 b and when necessary, attempts to resolve any detected residue distribution performance deficiency in the first harvested area 122 a."

Signed and Sealed this
Second Day of July, 2024

Katherine Kelly Vidal
*Director of the United States Patent and Trademark Office*